United States Patent
Hu et al.

(10) Patent No.: US 11,584,296 B2
(45) Date of Patent: *Feb. 21, 2023

(54) METHOD AND APPARATUS FOR VEHICLE-STATE ALERTS INDICATIVE OF UNDESIRABLE CONDITIONS

(71) Applicant: FORD GLOBAL TECHNOLOGIES, LLC, Dearborn, MI (US)

(72) Inventors: Jeffrey Yizhou Hu, Ann Arbor, MI (US); Michael Crimando, Ferndale, MI (US); Michael David Kaminski, Dearborn, MI (US); Austin Kirk, Sterling Heights, MI (US); Derrick Portis, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,894

(22) Filed: Sep. 15, 2021

(65) Prior Publication Data

US 2022/0001801 A1 Jan. 6, 2022

Related U.S. Application Data

(63) Continuation of application No. 15/947,196, filed on Apr. 6, 2018, now Pat. No. 11,135,974.

(51) Int. Cl.
  *B60Q 11/00* (2006.01)
  *B60R 16/037* (2006.01)
  *B60Q 9/00* (2006.01)

(52) U.S. Cl.
  CPC .............. *B60Q 11/005* (2013.01); *B60Q 9/00* (2013.01); *B60R 16/037* (2013.01)

(58) Field of Classification Search
  CPC ........ B60Q 11/005; B60Q 9/00; B60R 16/037
  See application file for complete search history.

(56) References Cited

U.S. PATENT DOCUMENTS

| | | | |
|---|---|---|---|
| 9,401,087 B2 | 7/2016 | Tengler et al. | |
| 2010/0039248 A1 | 2/2010 | Mauro | |
| 2014/0247158 A1 | 9/2014 | Tengler et al. | |
| 2015/0217981 A1 | 8/2015 | Baillargeon et al. | |
| 2017/0182977 A1 | 6/2017 | Chen et al. | |

*Primary Examiner* — Nabil H Syed
*Assistant Examiner* — Cal J Eustaquio
(74) *Attorney, Agent, or Firm* — Joseph Zane; Brooks Kushman P.C.

(57) ABSTRACT

A system includes a processor configured to determine an applicable pre-defined vehicle system state set, defining preferred vehicle system states when a driver is away from a vehicle. The processor is also configured to determine a driver exit-event while a vehicle state in the state set varies from a preferred setting and notify a driver mobile device of the variance, responsive to the exit event.

20 Claims, 3 Drawing Sheets

METHOD AND APPARATUS FOR VEHICLE-STATE ALERTS INDICATIVE OF UNDESIRABLE CONDITIONS

CROSS-REFERENCE TO RELATED APPLICATIONS

This application is a continuation of U.S. application Ser. No. 15/947,196 filed Apr. 6, 2018, now U.S. Pat. No. 11,135,974, issued Oct. 5, 2021, the disclosure of which is hereby incorporated in its entirety by reference herein.

TECHNICAL FIELD

The illustrative embodiments generally relate to methods and apparatuses for vehicle state alerts indicative of undesirable conditions.

BACKGROUND

Many drivers have experienced the deleterious effect of leaving a vehicle window open or a door ajar during a rainstorm. If a driver forgets to seal a vehicle, these situations can lead to short-term and long-term damage to a vehicle interior. Another common occurrence is leaving a vehicle interior light on for a prolonged time period, which can drain a vehicle battery of charge.

As vehicles begin to include more controllable systems, more remote functionality (e.g., whereby passengers can manipulate vehicle systems from phones), and more power-draining options (e.g., leaving a chargeable device plugged in), there is an increased opportunity for power drain). Accordingly, drivers are left in the position of having to check an ever-increasing number of parameters when leaving a vehicle, especially for a prolonged time period (such as at an airport) or in inclement weather.

SUMMARY

In a first illustrative embodiment, a system includes a processor configured to determine an applicable pre-defined vehicle system state set, defining preferred vehicle system states when a driver is away from a vehicle. The processor is also configured to determine a driver exit-event while a vehicle state in the state set varies from a preferred setting and notify a driver mobile device of the variance, responsive to the exit event.

In a second illustrative embodiment, a system includes a processor configured to determine that a vehicle system state does not match a preferred state setting, responsive to determining that a driver has exited a vehicle. The processor is also configured to send a state notification message, including the present system state, to a driver mobile device. The processor is further configured to receive a state modification response from the mobile device and adjust the vehicle system state in accordance with the state modification response.

In a third illustrative embodiment, a system includes a processor configured to determine that a vehicle system state does not match a preferred state setting, responsive to determining that a driver has exited a vehicle. The processor is further configured to revert the vehicle system state to the preferred state setting automatically, responsive to the determination that the vehicle system state does not match the preferred state setting.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
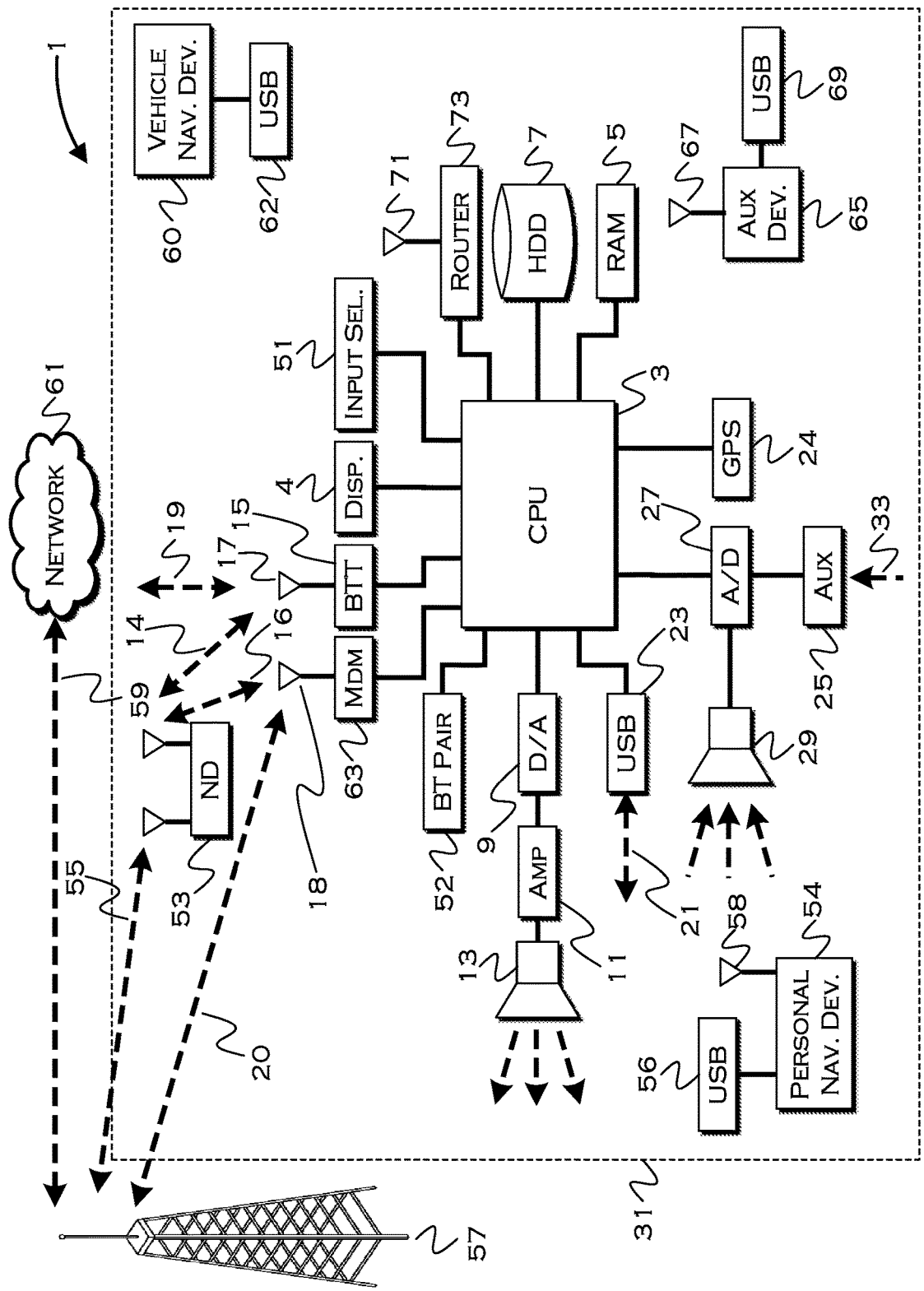
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73. The CPU can further be connected to an embedded cellular modem, providing on-board cellular connectivity in the absence of a wirelessly connected cellular device.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Vehicle drivers who are not diligent about checking for power-drains and open vehicle compartments may occasionally discover that their vehicle has been left in an undesirable state, which, in conjunction with an environment, can cause short or long-term damage to a vehicle. Many vehicles come equipped with multiple charging points, in-vehicle media systems and automatic window, gate and roof controls. An errant touch or an accidental oversight can lead to these and other systems being left in an altered state. This, in turn, can result in power drain or exposure of a cabin to exterior effects.

Instead of requiring a driver to fully inspect a vehicle upon parking and departure, the illustrative embodiments provide for systems and methods whereby a vehicle can intelligently inform a driver of any altered states, and, in some instances, correct the altered state automatically or in response to a driver instruction.

For example, if a driver is traveling with a front and rear passenger in the summer, all parties may elect to roll down windows, and both passengers may plug devices in for charging. While the driver may remember to roll up the front windows upon vehicle exit, the driver may forget to check the rear windows. Also, the driver may forget to check on the charging devices, and the combination of these factors can results in damage to the interior, a low battery state and/or a stolen device.

If the weather is consistently hot, the driver may want to leave all windows rolled down slightly, unless there is a device plugged in (which could be stolen). So, in one example, vehicle logic can respond to both weather and device status in the preceding, and inform the driver that the windows are down, and are in a preferred state for the weather, except that there are also devices present in the vehicle that could be stolen. The driver can then use a mobile device (on which the notification was provided), to instruct the windows to remain down or be rolled up. Alternatively, the driver may simply return to the vehicle and retrieve a forgotten device.

If the driver elects to keep the windows rolled up, but does not want to remove the device(s), and if the vehicle battery is at a low state of charge, the process may notify the user that the devices may overly drain the vehicle battery. In this case, the driver could selectively instruct charge-cessation for one or more of the devices. Since the vehicle is capable of detecting state changes (e.g., windows, charging, etc), notifying a driver and responding to requests (and/or any or some of the preceding), the vehicle can adapt, notify and react to a varied set of altered states in a manner that generally reflects driver preferences.

Figure 2:
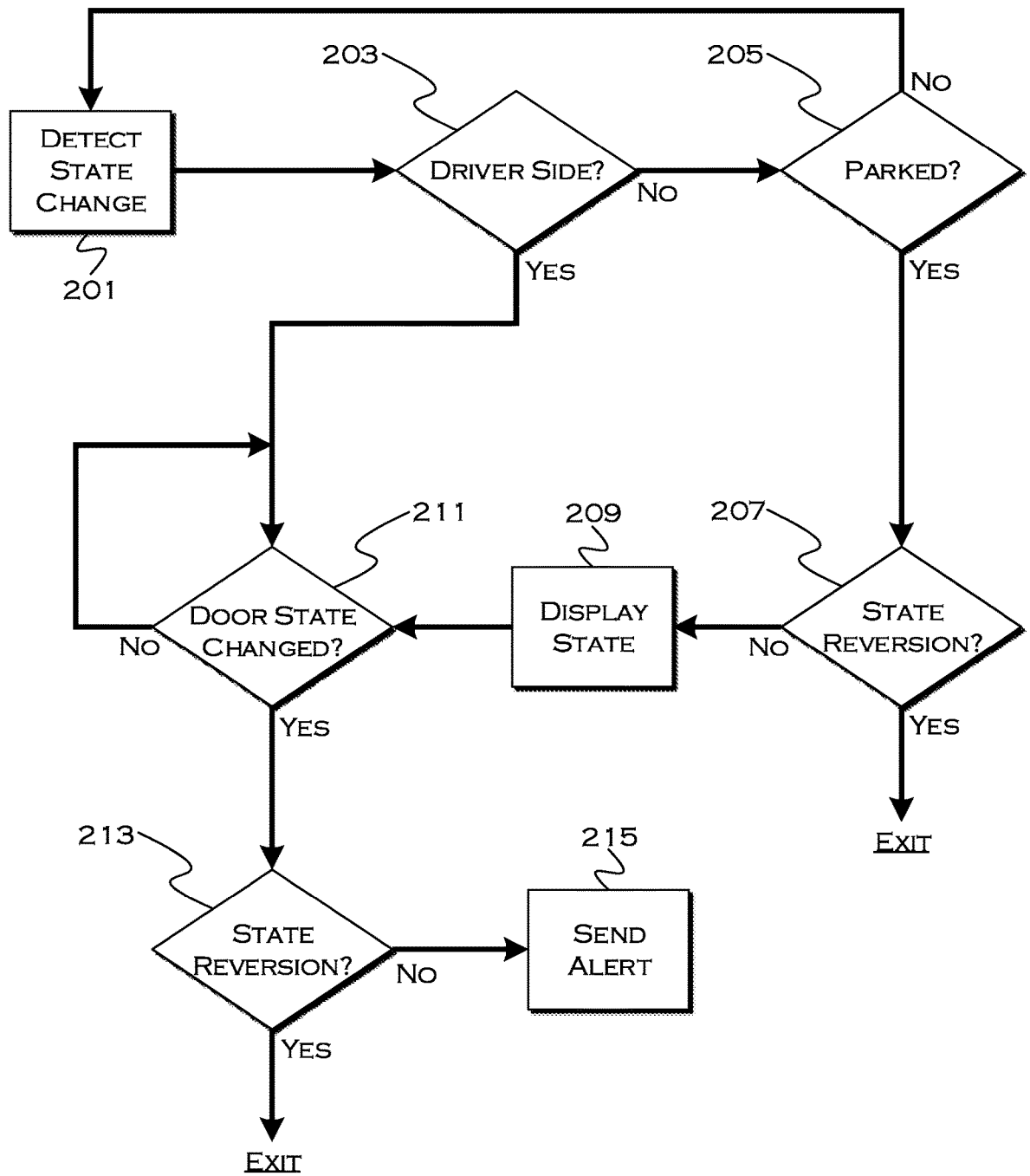
FIG. 2 shows an illustrative process for state-change notification.

FIG. 2 shows an illustrative process for state-change notification. In this example, the vehicle detects 201 a state change. The system may have a preset "preferred" state set for how a vehicle is preferably (according to driver preference) left, and any deviance from this state set can be registered as a change. This can also include a plurality of preferred system state settings based on, for example, location, weather, time of day, day of week, month, etc. That is, the driver may prefer the windows remain down 1 inch in summer heat when a vehicle is parked at home, but rolled up otherwise. In the winter or during rain, the driver may want a sealed cabin as a base-state. As such, the vehicle is capable of determining an appropriate base-state for any conditional variables, and then determining any changes that deviate from the base-state for a given instance of vehicle use.

An owner or driver can predefine a variety of preferred state sets and preferred state settings, or the owner can simply have a base-state in which the vehicle is always preferably left. The process may also use a previously parked state as a baseline, essentially attempting to maintain whatever state the vehicle was in when the driver initially entered.

States can include, but are not limited to:

Vehicle lights (interior, headlight, hazard) and preferred power settings.

With regards to vehicle lights, while they may primarily be preferred in an off state, if the driver is attempting to illuminate an area at night or otherwise use the vehicle as a light-source, the driver may want the lights to remain on. In another example, the hazard lights might have a different preferred state when the driver is parked in a known no-parking zone, which can notify the driver that the hazards are not engaged, even though the vehicle is parked inappropriately.

Window/moonroof states and preferred positions.

With regards to windows and moonroofs, the driver may want the vehicle sealed unless, for example, the driver is at home or interior temperatures reach an unacceptable level. The window states can be conditioned off of location, interior and exterior temperature, if desired, as well as based on other variables.

Vehicle accesses (doors, gates) and preferred access states (open, closed, locked, unlocked).

Typically, users prefer to leave vehicle accesses locked and closed, but for various reasons under certain conditions a user may want to leave a vehicle unlocked or partially open. The state preferences for these systems can similarly be conditioned on variables.

Vehicle charger states and/or power draw states and preferred usage or maximum loads.

If the vehicle will continue to charge a device when the vehicle is not powered, a preference for charging states can be conditioned on a current battery state. This can help prevent overuse of a battery while a vehicle charge is low. In a similar manner, media and other power drawing devices may be left on, and a user may have a maximum power draw preference contingent on battery charge and/or remaining battery life (e.g., a projected battery life based on draw).

Vehicle level state and preferred off-level condition.

This can refer to the yaw, pitch or roll of a parked vehicle, and the preferred states can also include an emergency brake state responsive to an off-level condition. Alternatively, the preferred states may be contingent on whether the brake is engaged, so either state (level or brake) can be a precondition for the other.

An additional consideration in this process is whether the state change was made to a driver-centric system or not. Since the driver will presumably know when the driver has changed a state, the system can elect to assume these changes are intentional in some instances and not report atypical states if the state-control was effected by the driver. On the other hand, the system can choose to report all atypical states if the owner so prefers.

If the change was not made to a driver-centric system, the process may determine 205 if the vehicle is parked. If the vehicle is not parked, the system may wait until the vehicle is parked, to avoid unnecessarily distracting a driver while the vehicle is in motion. Of course, drivers can also preset some or all states for notification during driving if desired.

Once the vehicle is parked, the process may determine 207 if the state was reverted to a preferred state (e.g., the window was returned to a preferred position). If the state was not reverted (within a time period or contingent on a driver exiting and/or walking away from the vehicle, for example), the process may display 209 a state notification. This notification can be done on a vehicle display and/or sent to a mobile device associated with an owner or driver. In this example, the process uses an initial time-out consideration for state-reversion, and then displays the off-preference state on a vehicle display. If and when a driver door state changes 211 (e.g., the driver exits the vehicle), the process rechecks 213 for reversion. If the state has not reverted to a preferred setting, the process may then send 215 an alert to the driver's mobile device.

Figure 3:
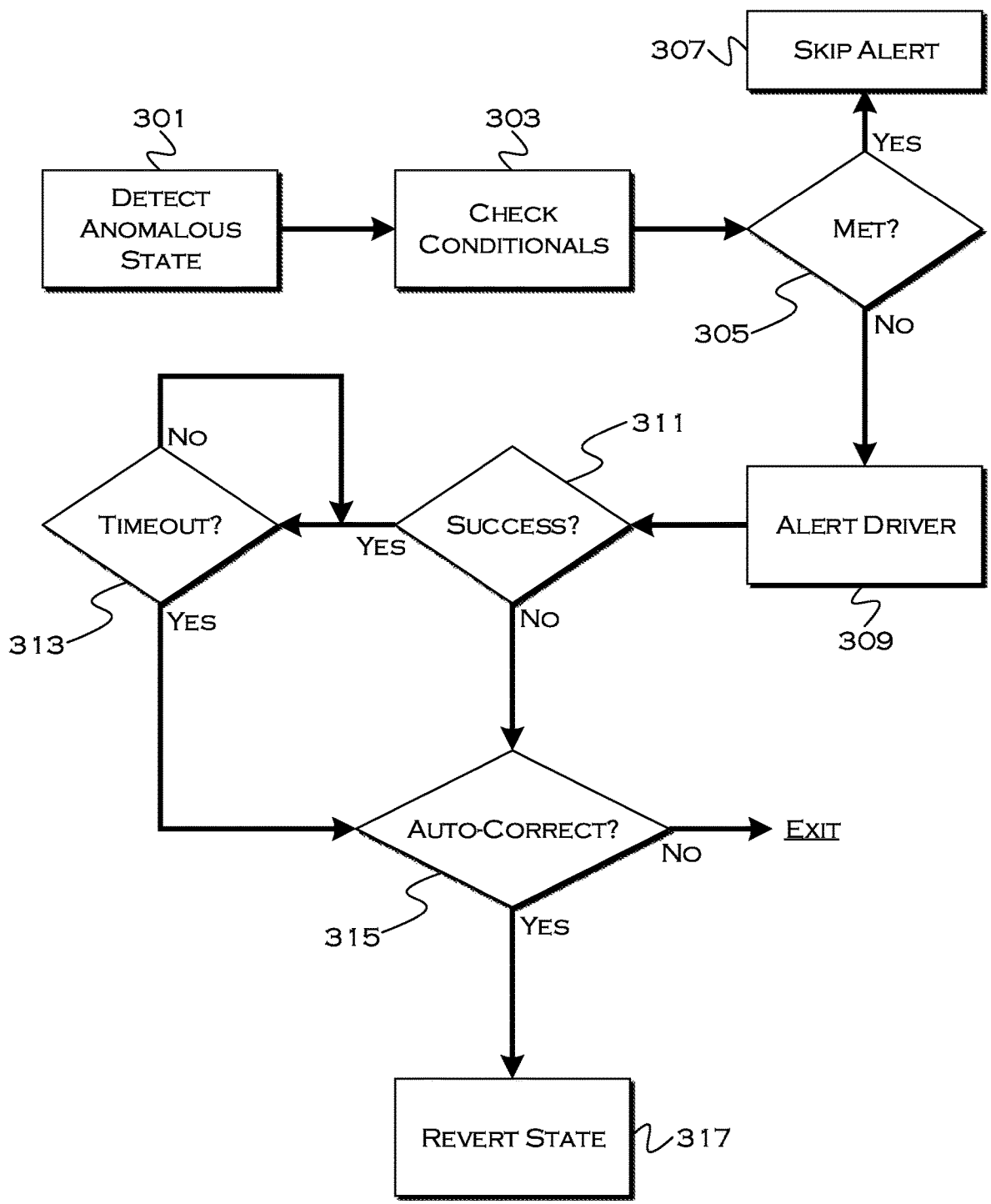
FIG. 3 shows an illustrative process for state-change mitigation.

FIG. 3 shows an illustrative process for state-change mitigation. The vehicle computing system is capable of multiple responses to an anomalous or off-preference detected state. In this example, the system can automatically revert to a preferred form for certain states. Since there are a multitude of conditions under which a driver may not want a vehicle to automatically revert to a preferred state, the system does not necessarily automatically revert. Drivers can also set conditions for automatic reversion (e.g., windows down and inclement weather) as well as optional reversion (driver specified on instance-by-instance) conditions.

If the process detects 301 an anomalous state, which is a state other than an OEM recommended or a preferred state, the process may check 303 any conditionals associated with the state. For example, if the driver generally wants windows up, but has a conditional corresponding to temperature, the process may determine that the temperature conditional is met and that the windows should, in fact, be left down. The process may also check secondary conditionals at this time, such as whether any devices are known to be within the vehicle (which might be an automatic-up conditional for windows). If the conditionals for the current state are met (e.g., the state is appropriate based on context), the process may skip 307 the alert procedure.

If the conditionals are not met, the process may alert 309 the driver via a driver mobile device or email. This allows the driver to be made aware of the anomalous state, which may or may not have been a driver-intended state. The alert may also include an option to change the state, such as rolling up windows, locking doors or disabling power drawing systems. If the message delivery is successful 311, but the driver does not respond in time 313, or if the delivery is not successful 311, the process may attempt automatic reversion.

If the driver responds with a command to revert or maintain a state, the process can skip over any automatic adjustment. The process can also inform the driver of the values of any variables (i.e., the states of conditionals) relative to any preferred settings or thresholds, so that the driver does not make a decision with incomplete information. This is not necessary, but is a feature that can be added if desired. In other examples, the process may simply alert the driver to the anomalous state and await a response (or automatically react).

If the system includes an automatic reversion preference 315, the vehicle can place the system into the preferred state. This is not always possible for all states, since a vehicle cannot necessarily close a door left ajar, for example. But if reversion is preferred and possible, the vehicle may revert 317 the anomalous state to one that corresponds to a preference.

The vehicle (or backend) may also track interior and exterior environmental changes, and use those changes as a trigger for notifying a driver. For example, when a vehicle has confirmed the current set of vehicle states (e.g., windows slightly cracked), the vehicle may also note the current environmental conditions. If there is a significant delta from those conditions (e.g., temperature rise/drop), or a prediction of a change in environment above a threshold (such as rain above 30%), the vehicle may re-check with the driver to confirm that the present states should be maintained. Changes under these deviances can also be automatically triggered based on certain thresholds or deviances.

The illustrative embodiments allow for inadvertent state change monitoring in a manner that improves the driver experience and makes the vehicle behave in a smart-seeming manner, while preserving the integrity of the vehicle and adapting to driver decision-making.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor of a vehicle, configured to:
store a user-configured state setting defining a preferred vehicle system state setting for the vehicle and at least one conditional variable having a value or threshold defined by the user and defined for an automatic reversion to the preferred state;
determine that a vehicle system state does not match the preferred state setting, responsive to determining that a driver has exited a vehicle;
determine that a current variable value for the conditional variable corresponds to the conditional variable value or threshold set for automatic reversion; and
revert the vehicle system state to the preferred state setting automatically, responsive to the determinations that the vehicle system state does not match the preferred state setting and that the detectable variable value corresponds to the value or threshold defined for automatic reversion.

2. The system of claim 1, wherein the vehicle system state setting includes a window position and wherein the conditional variable includes a weather variable.

3. The system of claim 2, wherein the conditional variable value for the weather variable includes a temperature threshold defined for automatic reversion to a preferred state including a defined non-closed position for the window position.

4. The system of claim 2, wherein the conditional variable value for the weather variable includes a chance-of-precipitation threshold defined for automatic reversion to a preferred state including a defined fully closed position for the window position.

5. The system of claim 1, wherein the vehicle system state setting includes a window position and wherein the conditional variable includes the detected presence of one or more electronic devices in the vehicle.

6. The system of claim 5, wherein the conditional variable value for the detected presence of electronics in the vehicle includes positively detecting one or more electronic devices defined for automatic reversion to a preferred state including a defined fully closed position for the window.

7. The system of claim 1, wherein the processor is further configured to:
notify the driver of the vehicle system state that does not match the preferred state setting, the notification including at least the current variable value for the conditional variable.

8. The system of claim 1, wherein the processor is further configured to:
notify the driver of the vehicle system state that does not match the preferred state setting; and
delay reversion of the vehicle system state until a predefined response time period, subsequent to the notification, has passed.

9. The system of claim 1, wherein the processor is further configured to:
notify the driver of the vehicle system state that does not match the preferred state setting, and wherein the reversion of the vehicle system state is further responsive to a determination by the processor that the notification was not successfully delivered.

10. A system comprising:
a processor of a vehicle, configured to:
store a user-configured state setting defining a preferred vehicle system state setting for the vehicle and at least one conditional variable having a value or threshold defined by the user and defined for an automatic reversion to the preferred state;
determine that a vehicle system state does not match the preferred state setting, responsive to determining that a driver has exited a vehicle;
determine that a current variable value for the conditional variable corresponds to the conditional variable value or threshold set for automatic reversion;
notify the driver of the vehicle system state that does not match the preferred state setting; and
revert the vehicle system state to the preferred state setting automatically, responsive to the determinations that the vehicle system state does not match the preferred state setting and that the detectable variable value corresponds to the value or threshold defined for automatic reversion.

11. The system of claim 10, wherein the vehicle system state setting includes a window position and wherein the conditional variable includes a weather variable.

12. The system of claim 11, wherein the conditional variable value for the weather variable includes a temperature threshold defined for automatic reversion to a preferred state including a defined non-closed position for the window position.

13. The system of claim 11, wherein the conditional variable value for the weather variable includes a chance-of-precipitation threshold defined for automatic reversion to a preferred state including a defined fully closed position for the window position.

14. The system of claim 10, wherein the vehicle system state setting includes a window position and wherein the conditional variable includes the detected presence of one or more electronic devices in the vehicle.

15. The system of claim 14, wherein the conditional variable value for the detected presence of electronics in the vehicle includes positively detecting one or more electronic devices defined for automatic reversion to a preferred state including a defined fully closed position for the window.

16. The system of claim 10, wherein the notification includes at least the current variable value for the conditional variable.

17. The system of claim 10, wherein the processor is further configured to delay reversion of the vehicle system state until a predefined response time period, subsequent to the notification, has passed.

18. The system of claim 10, wherein the reversion of the vehicle system state is further responsive to a determination by the processor that the notification was not successfully delivered.

19. A method comprising:
storing a user-configured state setting defining a preferred vehicle system state setting for the vehicle and at least one conditional variable having a value or threshold defined by the user and defined for an automatic reversion to the preferred state;
determining that a vehicle system state does not match the preferred state setting, responsive to determining that a driver has exited a vehicle;
determining that a current variable value for the conditional variable corresponds to the conditional variable value or threshold set for automatic reversion;
notifying the driver of the vehicle system state that does not match the preferred state setting; and
reverting the vehicle system state to the preferred state setting automatically, responsive to the determinations:
that the vehicle system state does not match the preferred state setting,
that the detectable variable value corresponds to the value or threshold defined for automatic reversion, and
that at least one contingent variable associated with the notification is met.

20. The method of claim 19, wherein the contingent variable being met includes at least one of a predefined response time period, subsequent to the notification, having lapsed, or determining that the notification was not successfully delivered.

* * * * *